(No Model.)
G. BRESSLER.
Car Brake.
No. 234,525. Patented Nov. 16, 1880.
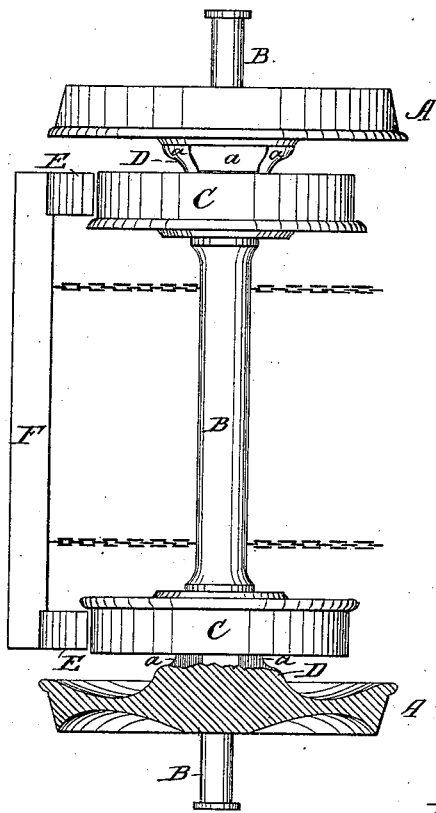
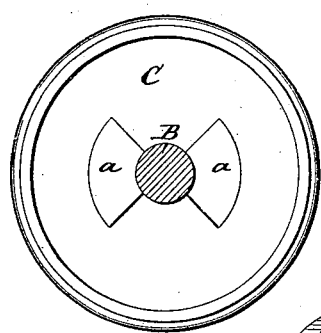
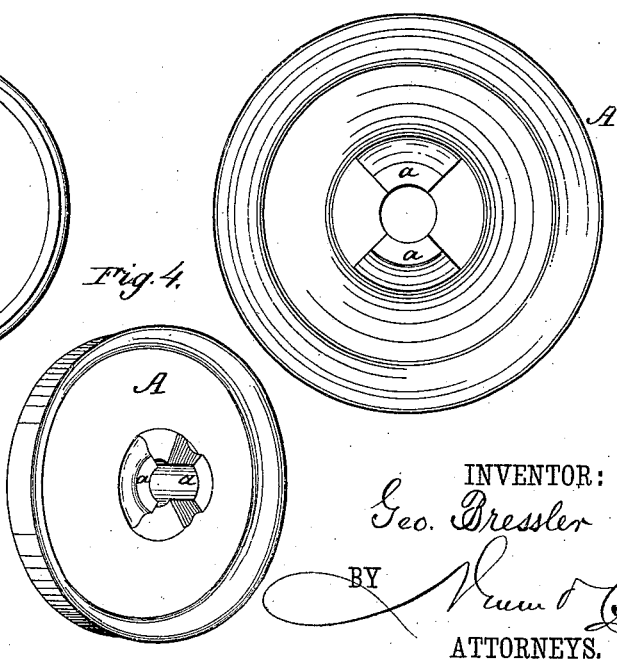
WITNESSES:
W. W. Hollingsworth
Jolon C. Kennon
INVENTOR:
Geo. Bressler
BY
ATTORNEYS.

UNITED STATES PATENT OFFICE.

GEORGE BRESSLER, OF ALTOONA, PENNSYLVANIA.

CAR-BRAKE.

SPECIFICATION forming part of Letters Patent No. 234,525, dated November 16, 1880.

Application filed April 17, 1880. (No model.)

*To all whom it may concern:*

Be it known that I, GEORGE BRESSLER, of Altoona, in the county of Blair and State of Pennsylvania, have invented a new and useful Improvement in Car-Brakes; and I do hereby declare that the following is a full, clear, and exact description of the same.

My invention is an improvement in that class of railway-car trucks in which the brakes are not applied to the flanged running wheels, but to small wheels which are mounted on the axle between the truck or running wheels.

The invention consists in locking such brake-wheels to the running wheels by means of projections or clutch-fingers formed on their respective hubs, both sets of wheels being also keyed to the axle, so that when the brakes are applied the running wheels will not be subjected to wear, and yet the force acting on the brake will be transmitted to such wheels without torsional strain on the axle.

In accompanying drawings, forming part of this specification, Figure 1 is a plan view, part being broken away, of a car axle, wheels, and brake constructed and arranged according to my invention. Fig. 2 is a view of the outer side of one of the brake-wheels. Fig. 3 is a like view of inner side of one of the transporting or truck wheels. Fig. 4 is a perspective view of one of the brake-wheels.

The transporting-wheels A A are both fast on the axle B, being forced on in the usual way. Contiguous to these wheels A A are placed the smaller brake-wheels C C, which are also fast on the axle. Each brake-wheel is locked with the contiguous transporting-wheel by means of a clutch, D, formed of segmental projections *a* on the respective hubs. The brake-shoes E are applied to the wheels C C and not to the wheels A.

It is obvious that by this connection of the two sets of wheels the axle is mainly relieved of torsional strain, since the action of the brake on the wheels C is, in effect, the same on the wheels A, by reason of their being so firmly locked together. The transporting-wheels A are also subjected to no wear by reason of friction with brake-shoes, so that they will not be worn down or flattened as rapidly as usual.

The beam F, to which the brake-shoes E are attached, is of such length that in case it shall become detached it will fall between the rails and not on them, so that accident to the car will not be likely to occur from such cause.

I do not claim, broadly, the employment of friction or brake wheels located on the inner side of or between the transporting-wheels of a car-axle.

What I claim is—

The combination of the transporting-wheels and brake-wheels, having interlocking projections on the adjacent ends of their hubs, substantially as shown and described, for the purpose specified.

GEORGE BRESSLER.

Witnesses:
JACOB S. STIER,
WM. F. GARDNER.